Dec. 26, 1933.  H. DECKEL ET AL  1,941,291
PHOTOGRAPHIC SHUTTER
Filed Sept. 12, 1932   2 Sheets-Sheet 2
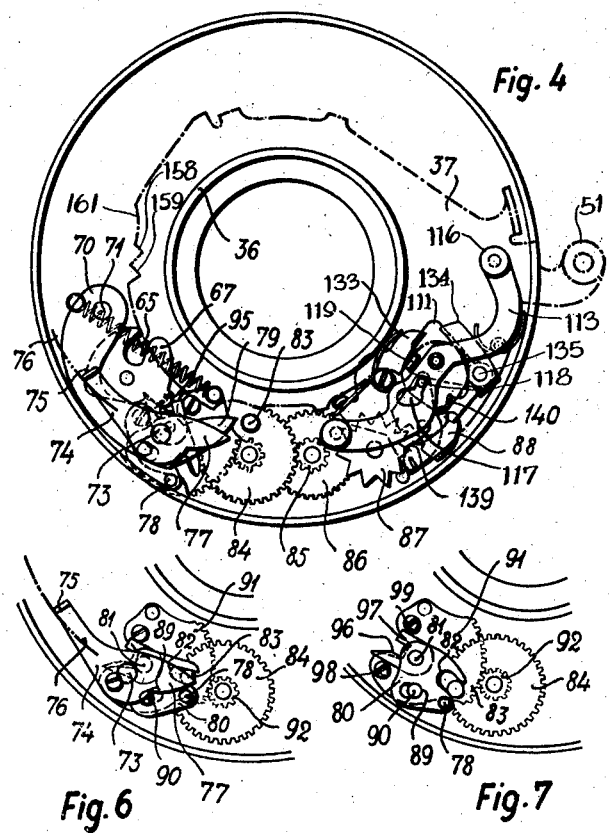
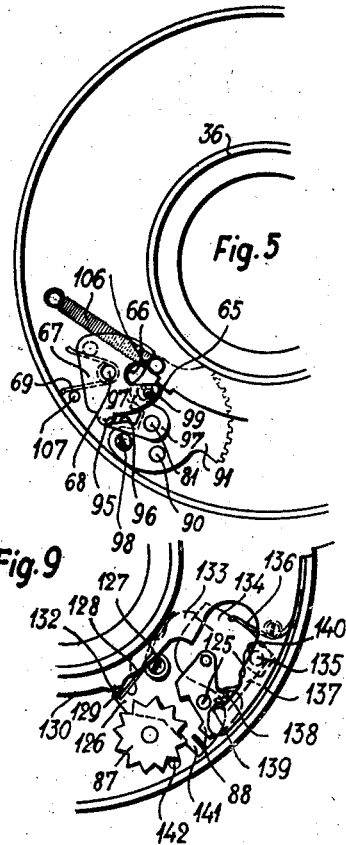
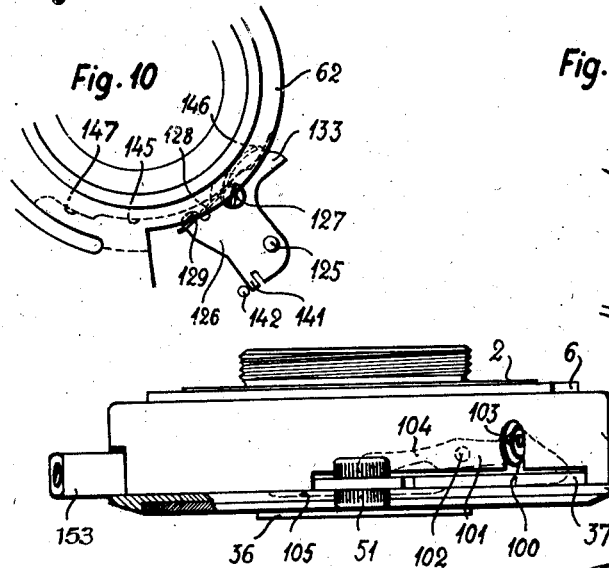
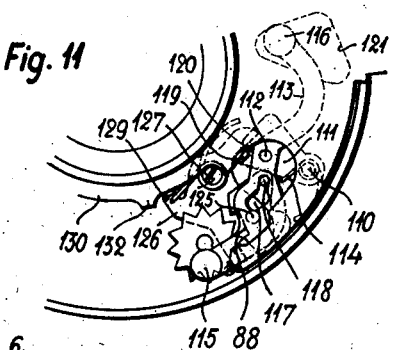
Inventors
Hans Deckel
Michael Burger
By Edward H. Cumpston
their Attorney Patented Dec. 26, 1933

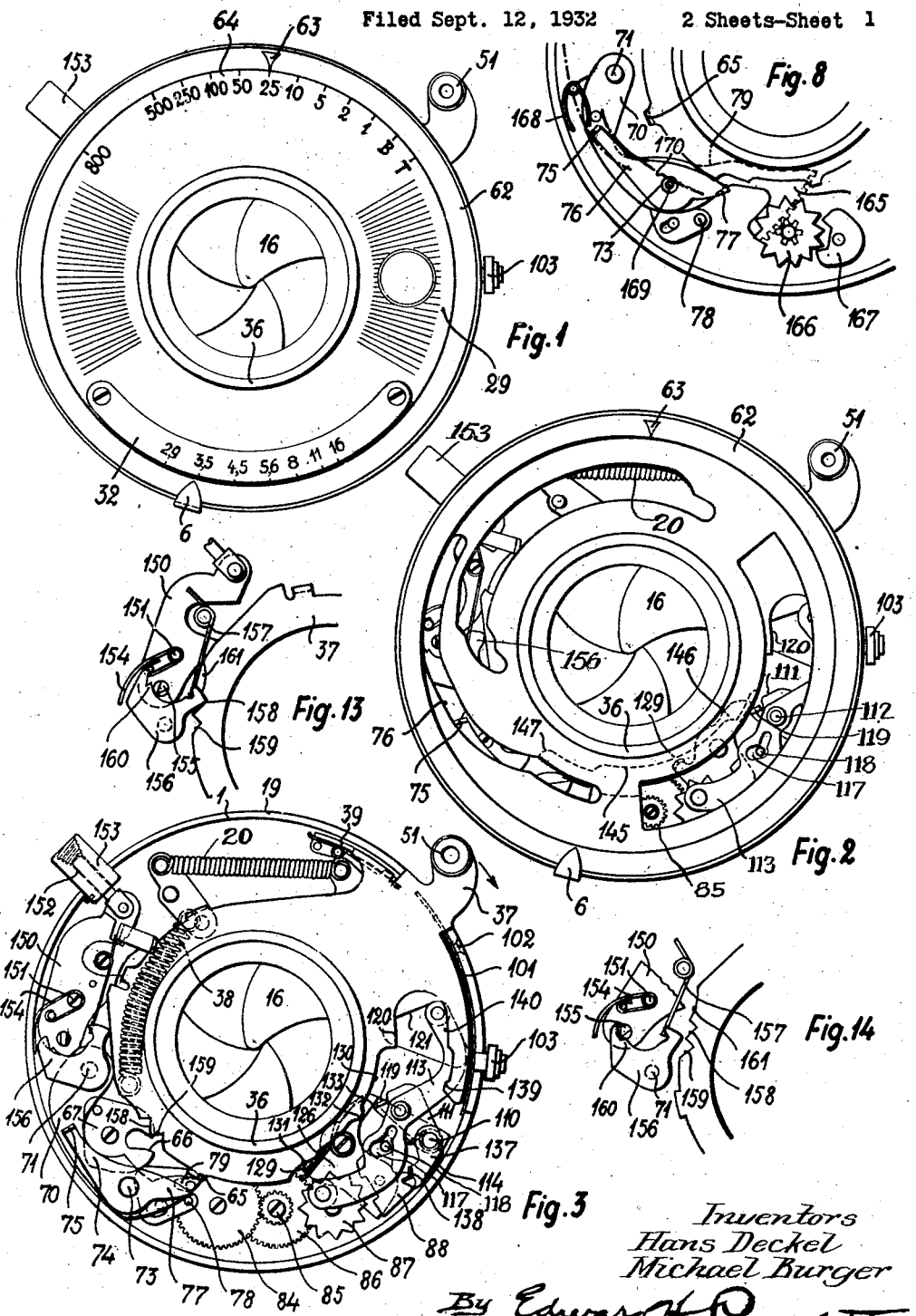

1,941,291

UNITED STATES PATENT OFFICE 1,941,291

PHOTOGRAPHIC SHUTTER

Hans Deckel, Solln, near Munich, and Michael Burger, Munich, Germany, assignors to Friedrich Deckel, Munich-Ludwigshohe, Germany Application September 12, 1932, Serial No. 632,722, and in Germany August 28, 1930

24 Claims. (Cl. 95—63)

This invention relates to photographic shutters and deals particularly with improvements in the operating mechanism for such shutters.

An object of the invention is the provision of simplified and more satisfactory mechanism for operating the shutter, which can be employed in a shutter of relatively small size, which can be readily adjusted, and in which the length of the times of exposure may be timed with great accuracy.

Another object is the provision of shutter mechanism so designed and arranged as to make possible a smooth operation without undue wear upon any of the parts.

Still another object is the provision of improved retarding mechanism for a photographic shutter, and particularly of mechanism having a lower transmission ratio at the beginning of the operation and a higher transmission ratio later in the operation of the shutter, so that the retarding mechanism may be started with ease and may be suitable for obtaining short times of exposure while at the same time the higher transmission ratio, when brought into play, enables the retarding mechanism to be used for long times of exposure.

Still another object is the provision of a shutter in which the same retarding mechanism used for timing the exposures may also be employed for delaying the beginning of the exposure.

A further object of the invention is the provision of simple auxiliary means which may be brought into play to increase the resistance of the retarding means when the latter is used to delay the beginning of the exposure.

A still further object is the provision of simple auxiliary retarding means which may be employed to the exclusion of the main retarding means for obtaining exposures of extremely short duration.

A still further object is the provision of a shutter in which parts which normally cooperate with each other during medium length or long exposures are kept out of operation with each other during extremely short exposures in order to prevent damage to the parts.

To these and other ends the invention resides in certain improvements and combinations of parts, all as will be hereinafter more fully described, the novel features being pointed out in the claims at the end of the specification.

In the drawings:

Fig. 1 is a front view of a shutter constructed in accordance with a preferred embodiment of this invention;

Fig. 2 is a similar view of the shutter with the cover plate removed, showing the setting disk;

Fig. 3 is a similar view with the setting disk also removed showing the other parts of the operating mechanism beneath the setting disk;

Fig. 4 is a view showing the mechanism set in position for making a pre-timing or delayed beginning exposure;

Fig. 5 is a view of some of the mechanism shown in Fig. 4 at the completion of the pre-timing or delayed beginning movement and with the exposure itself about to begin;

Fig. 6 is a view of some of the retarding mechanism parts in an intermediate position;

Fig. 7 is a similar view with the parts moved somewhat farther;

Fig. 8 is a view illustrating the auxiliary or retarding mechanism which may be employed for timing exposures of short duration;

Fig. 9 is a view of the mechanism for disconnecting the escapement anchor from the escapement wheel of the retarding mechanism, showing the parts disconnected;

Fig. 10 is a fragmentary view of some of the parts shown in Fig. 9, illustrating additional details;

Fig. 11 is a view illustrating the auxiliary mechanism coupled to the main retarding mechanism for use during a pre-timing or delaying beginning operation;

Fig. 12 is an edge view of the shutter showing the stop means controlling the set position of the actuating ring;

Fig. 13 is a view of the release mechanism for the actuating member, and

Fig. 14 is a fragmentary view of part of the mechanism shown in Fig. 13, showing the parts in a position which they assume just after releasing the actuating member for a pre-timing operation.

The same reference numerals throughout the several views indicate the same parts.

Referring now to the drawings, the shutter housing comprises an outer annular rim or tube 1 and a rear wall 2. The open front side of the housing is closed by the setting disk or adjusting disk 62 and the cover plate 29, both mounted upon the lens tube 36 projecting forwardly from a base plate 19 forming an annular partition in the housing slightly in front of the rear wall 2. The cover plate 29 is fixed in position on the lens tube when the shutter is assembled, but the setting or adjusting disk 62, held in position by the cover plate, is capable of limiting oscillation about the lens tube.

The setting disk carries an index mark 63 (Fig. 1) which, by oscillating the disk in one direction or the other, may be adjusted to any one of the graduations 64 on the cover plate 29, which indicate the duration of exposure and the character of the setting. The cover plate 29 also carries a scale plate 32 cooperating with an indicator and operating member 6 for controlling any suitable stop device such as an iris diaphragm.

The iris diaphragm blades as well as the shutter blades 16, which may be of known form, are arranged in the space between the rear wall and the base plate or partition member 19. The shutter blades are driven in their opening and closing movements in any suitable known manner from an actuating ring or master member 37 mounted for oscillation on the lens tube 36 and controlled by a spring 38 connected at one end to the master member and at the other end to a pin on the base plate 19 so as to tend to move the master member 37 in a counterclockwise direction. A stop 39 (Fig. 3) is provided for limiting the movement of the master member in this direction.

The other parts of the operating and control mechanism of the shutter will be described by way of example in connection with an embodiment constituting what is known as a "set" shutter, that is, a shutter which is initially set and is then released to make the exposure. It will be obvious to those skilled in the art that most or all of the details of construction are applicable equally well to shutters of the so-called "automatic" type which require no preliminary setting.

In the following description, those parts of the mechanism which come into play in an ordinary exposure without the pre-timing or delayed beginning feature, will first be described. To set the shutter for such an ordinary exposure, the arm 51 forming part of the master member 37 and projecting in a convenient position out of the casing, is moved downwardly in the direction of the arrow shown in Fig. 3, thus moving the master member clockwise against the tension of the spring 38 until the arm 51 comes into contact with the limiting stop or abutment 100 (Fig. 12). When the master member is turned to this extent, the pawl 156 (Figs. 3 and 13) drops into the notch 158 of the master member 37 as shown in Fig. 13 and holds the master member in this position until the pawl is released.

An ear 65 (Figs. 3, 4 and 5) is bent down from the master ring 37 and, during the setting movement above described it moves to a position slightly beyond the end 79 of a lever 70 free to oscillate on a pivot 71 mounted in any suitable manner such as on the base plate 19, for example. This lever 70 has pivoted to it at 73 a second lever 74 having at one end an upturned extension 75 cooperating with and controlled by a cam surface 76 on the setting ring 62 (Fig. 2), the other end 77 of the lever 74 being in contact with a pin 78 operatively connected to the retarding or escapement mechanism which will be described below. This pin 78 offers a comparatively great resistance to displacement. Consequently, if the setting ring 62 is moved in a clockwise direction so that the cam surface 76 forces the end 75 of the lever 74 inwardly toward the center of the shutter the lever 74 will rock about the pin 78 as a fulcrum, and the pivot 73 will likewise be moved inwardly toward the center of the shutter, carrying the lever 70 also inwardly so that the end 79 of the lever 70 is brought into the path of travel of the ear 65 on the master member. The extent to which the end 79 intercepts the path of travel of the ear 65 is controlled, of course, by the setting of the disk 62, since the latter controls the position of the end 75 of the lever 74.

After the shutter mechanism has been set in this manner, the release of the master member (by moving the pawl 156 out of the notch 158 through means described later) permits the master member to move in a counterclockwise direction under the influence of its motor spring 38. The first part of this movement in a counterclockwise direction is effective to open the shutter blades 16 in known manner. Then, while the shutter blades are still held open, the ear 65 on the master member strikes against the end 79 of the lever 70 and pushes the lever aside in an outward direction. In pushing the end 79 outwardly, the pivot 73 on the lever 70 will be moved outwardly and thus tends to move the lever 74 outwardly also. Since the end 75 of the lever 74 is held against outward movement at this time by the cam surface 76, the pivot 73 of the lever can move outwardly only by an outward movement of the opposite end 77 of the lever, and this outward movement causes a corresponding outward movement of the pin 78 which lies against the end 77, which pin is connected to the retarding mechanism as above mentioned. In this way, the movement of the master member is slowed down by the retarding mechanism while the blades are held open, so as to obtain a longer or shorter period of exposure as may be desired. For short exposures, the end 79 of the lever 70 extends only a short distance across the path of travel of the ear 65 so that this end does not have to be pushed aside very far and consequently the retarding mechanism does not have to be moved far. For longer exposures, however, the end 79 of the lever 70 extends farther across the path of travel of the ear 65, and the lever must be pushed farther before the ear 65 can slip past the end of the lever so that a greater movement of the retarding mechanism is necessary with a consequent increase in the time during which the shutter blades are held open. In any event, after the ear 65 has thrust aside and passed beyond the end 79 of the lever 70, the master member 37 continues its counterclockwise movement and closes the shutter blades in known manner.

The pin 78 which is engaged and moved by the end 77 of the lever 74, is mounted on a plate 80 oscillatable on the fixed pivot 81. A notch or slot 82 in the plate embraces and engages a pin 83 on a gear 84 so that when the plate 80 is turned in a clockwise direction by means of the lever 74, it produces a counterclockwise rotation of the gear 84. This gear drives a pinion 85 fixed to another gear 86, which in turn drives a pinion fixed to the escapement wheel 87, movement of which is impeded by the anchor 88.

When the gear 84 has made about one-fourth of a revolution from its position of rest, the pin 83 slides out of the notch 82 as shown in Fig. 7. Shortly before this takes place, however, the end 89 of a slot in the plate 80 comes into contact with the pin 90 fixed to a plate 91 arranged beneath the plate 80 and likewise rotatable on the pivot 81 (see especially Figs. 5 and 7). This plate 91 carries gear teeth, as plainly shown in the drawings, meshing with a pinion 92 fixed to the gear 84. As soon as the pin 83 on the gear 84 slips out of the notch 82 on the plate 80 the gear 84 is no longer driven through the pin 83, but it is then driven through the pin 90, plate 91, and pinion 92, so that the retarding mechanism continues its rotation in the same direction, but has a greater resistance since the transmission ratio through the pin 90, plate 91, and pinion 92, is higher than the transmission ratio through the notch 82 and pin 83.

Thus it is seen that the retarding mechanism has a low transmission ratio and a lesser resistance toward the beginning of its operation, and a higher transmission ratio and greater resistance during the remainder of its operation. This is a material advantage, first, because less force is required to overcome the inertia of the stationary parts and set the retarding mechanism into operation, and second, because the lesser resistance and low ratio at the beginning of the operation can be used for timing relatively short exposures, while the second part of the operation with the higher ratio can be conveniently brought into play for timing longer exposures.

When relatively short exposures are to be made, the adjustment of the levers 74 and 70 (caused by the adjusting disk 62) is such that the end 79 extends only slightly into the path of the ear 65 and can be thrust aside by the ear while the retarding mechanism is still operating at the low transmission ratio with less resistance. When longer exposures are to be made, the levers are adjusted so that the end 79 extends farther across the path of the ear 65, and when the end is thrust aside by the ear 65, the parts must move through a greater distance, operating the retarding mechanism not only through the period of low transmission ratio but through more or less of the subsequent period of higher transmission ratio and higher resistance.

If even the low resistance of the main retarding mechanism during the first part of its operation is too great for timing very short exposures, a special auxiliary retarding mechanism with very small resistance may be provided for timing the short exposures. This mechanism is best shown in Fig. 8, from which it is seen that the lever 70 is extended at its free end 79 to form a gear segment 165 meshing with a pinion fixed to an escapement wheel 166 of an auxiliary retarding mechanism, controlled by the anchor 167. After the master member 37 has been set, a spring 168 causes the lever 70 to move inwardly toward the center of the shutter until a pin 169 extending upwardly from the pivot 73 strikes against the edge 170 (shown by a dot dash line) of a recess made in the lower side of the setting disk 62. In this way the setting of the setting disk determines the extent to which the lever 70 is moved inwardly under the influence of the spring 168, and the extent to which the end 79 of this lever is arranged in the path of the ear 65. With this arrangement, the position of the lever 70 is not influenced by the position of the end 75 of the lever 74. On the contrary, when very short exposures are to be made with this mechanism, the end 75 is positioned outwardly at the extreme limit of its motion, thus swinging the lever 74 so that the end 77 of the lever is held entirely out of contact with the pin 78 connected to the main retarding mechanism. In this way, when the master member 37 is released and moves in a counterclockwise direction, no movement of the main retarding mechanism takes place at first, but the ear 65 strikes the end 79 of the lever 70 and moves the lever to actuate the auxiliary retarding means 166, 167. It is only during the latter part of the movement of the lever 70, if at all, that the main retarding mechanism is actuated by contact of the member 77 with the pin 78. Inasmuch as the resistance of the auxiliary retarding mechanism 165, 166, 167 is very slight, and as the cam edges 76 and 170 of the adjusting disk can be regulated within wide limits, this mechanism permits a very accurate adjusting of the shutter for short times of exposure.

According to the present invention, the main retarding mechanism may also be used for what may be called a pre-timed or delayed beginning exposure. That is, an exposure which will not take place until a short length of time, such as ten or twenty seconds, after the master member has been released. This pre-timing gives the person who actuates the shutter an opportunity to place himself in front of the camera before the exposure takes place, so that he may appear in the picture. When the main retarding mechanism is used for pre-timing, it is preferably coupled to auxiliary retarding mechanism which greatly increases the resistance and slows down the operation of the main retarding mechanism, so that a pre-timing period of ten to twenty seconds may be secured if desired.

In setting the master member 37 for ordinary exposures without the pre-timing feature, the clockwise setting motion of the master member is limited by engagement with the stop member 100, as previously mentioned. When pre-timing is to be employed, the stop 100 is thrust aside and the master member is moved through a greater distance when setting it. As shown particularly in Figs. 3 and 12, the stop 100 is formed on a lever 101 pivoted at 102 to the inside of the casing 1, and provided with an accessible button 103 which may be used to push the stop aside to make it possible to move the master member to an additional extent. In order to prevent the master member from being set unintentionally in the pre-timing position, the end of the lever 101 is extended as at 104 into the path of travel of the master member, so that each time the master member is released to make an exposure, it will contact with the end 104 and move the stop member 100 back to its normal position for an ordinary exposure, if it is not already in this position.

This extended end 104 is also utilized to prevent the use of the pre-timing feature when it would not be suitable, as for example, when the shutter is set for "bulb" or "time" exposures. It is also desired to prevent the use of pre-timing when the shutter is set for its highest speed instantaneous exposure, for example, one eight hundredth of a second, since at this time an additional motor spring 20 is inserted in known manner and stretched to its highest possible tension at the normal setting of the master member, so that the master member should not then be moved the additional amount necessary for pre-timing. To accomplish this safety interlock, the arm 104 is developed in such a manner that when the stop member 100 is moved aside to permit the pre-timing setting, the end 104 enters a recess 105 (Fig. 12) on the inner face of the adjusting disk 62. This recess is of such length that it is opposite the end 104 whenever the setting disk 62 is set for ordinary instantaneous exposures. When the setting disk is set for a "bulb" or "time" exposure, or for an exposure of one eight hundredth of a second, however, then the recess 105 is no longer in front of the arm 104 and the stop member 100 can not be moved aside sufficiently to permit the setting of the master member 37 in the pre-timing position. Also, when the master member has been set in a pre-timing position, it holds the member 104 in the recess 105 until the master member is released, and prevents the adjusting disk 62 from being set to the "bulb" or "time" or one eight hundredth second positions.

When the master member is set to effect pre-timing, it is moved to a greater extent in a clockwise direction from its rest position shown in Fig. 3, to the set position shown in Fig. 4. During this movement, the ear 65 on the master member enters a notch 66 (Figs. 4 and 5) in a plate 67 pivoted at 68 and moves the plate 67 in a counterclockwise direction (against the influence of the spring 69) from approximately the position shown in Fig. 5 to the set position shown in Fig. 4. During this movement, a downwardly extending tooth 95 on the plate 67 engages the slot in the plate 91 and moves this plate in a clockwise direction, thus turning the main retarding mechanism in the same direction in which it is turned while making an exposure, until it reaches the position shown in Fig. 4. The slot which is engaged by the tooth 95 to move the plate 91 is preferably not formed directly in the plate 91, but on a supplementary member 97 (Figs. 5 and 7) lying on top of the plate 91 and pivoted on the pin 81 on which the plate 91 is also pivoted. Eccentric adjusting screws 98 and 99 mounted on the plate 91 engage opposite sides of the member 97 so that by adjusting these screws the position of the member 97 may be varied slightly with respect to the plate 91, thus providing a very fine adjustment of the position of the slot 96 in the member 97 with relation to the plate 91.

It is to be noted that the arrangement of parts above described provides a very simple and satisfactory mechanism. The pressure of the ear 65 in turning the plate 67 is transmitted substantially in a tangential direction rather than in a radial direction, so that the relative position of the parts and consequent operation and timing of the device are not substantially affected by any radial displacement of the ear 65 due to the necessary play between the lens tube 36 and the master member 37.

When the master member is released after being set to the position shown in Fig. 4, the counter-clockwise rotation of the master member under the influence of the motor spring 38 causes the ear 65 on the master member to move the plate 67 in a clockwise direction from the position shown in Fig. 4 to that shown in Fig. 5. During this movement, the tooth 95 on the plate 67, engaging in the notch 96, moves the plate 91 in a counterclockwise direction and thus operates the main retarding mechanism of the shutter in a direction reverse to that in which it is operated during an exposure. At this time, auxiliary retarding mechanism is coupled to the main retarding mechanism, as described in detail below, so that the resistance of the retarding mechanism is increased and the operation is slowed up to such an extent that a period of, for example, ten to twenty seconds will elapse while the master member 37 and plate 67 are moved from the set position shown in Fig. 4 to the position illustrated in Fig. 5. When the parts finally reach the position shown in Fig. 5, the ear 65 on the master member slips out of the notch 66 in the plate 67 and from this point onward the operation is the same as that of an ordinary exposure without the pre-timing feature. Just as the ear 65 leaves the notch 66, the tooth 95 also leaves the notch 96, and by this time the counterclockwise movement of the plate 91 has re-engaged the pin 83 in the notch 82 so that the main retarding mechanism is now ready to move back in its normal direction to time the exposure itself. In connection with this, the pin 78 has contacted with the end 77 of the lever 74 and has thus forced the end 79 of the lever 70 into the path of the ear 65 by a certain amount determined by the setting of the adjusting disk 62. If the arrangement shown in Fig. 8 is used, the movement of the lever 70 takes place automatically under the influence of the spring 168. When the ear 65 has moved out of the notch 66, the pre-timing is over and the master ring 37 can now move freely to open the shutter blades 16, then striking against the end 79 of the lever 70 and operating the retarding or timing mechanism while the blades are held open, all as previously explained.

In order to time the exposure accurately, it is necessary that the retarding mechanism shall always be in the same position at the beginning of the exposure, irrespective of whether or not the retarding mechanism has previously been employed for pre-timing. This is insured in the present instance by the use of the adjusting means 97, 98, 99 previously mentioned. By this means, the parts can be finely adjusted so that as the tooth 95 leaves the notch 96, the plate 91 is brought to exactly the same position in which it would be if the pre-timing feature had not been used. This position to which the plate 91 is brought at the end of the pre-timing operation, and which is its position of rest for starting the timing of an exposure, is its extreme counterclockwise position in which the corner of the plate 91 rests against the lens tube 36, as shown in Fig. 5, and the spring 106 (Fig. 5) tends always to pull the plate 91 to this position, thus further insuring the proper positioning of the plate and the other parts of the retarding mechanism at the beginning of each exposure.

As stated above, the main retarding mechanism when used for pre-timing is coupled to an auxiliary retarding mechanism to increase the resistance and slow down the operation of the escapement. This auxiliary retarding mechanism, shown particularly in Figs. 3, 4, and 11, comprises a stationary pivot 110 near the anchor 88, on which pivot is a plate 111 to which is pivoted at 112 a pendulum 113 extending a substantial distance in both directions from its pivot 112 and having masses 115 and 116 at its opposite ends. In one arm of the pendulum near the pivot 112 is a slot 117 having a wide part and a narrow part, as plainly shown in the drawings. This slot overlies the anchor 88 of the escapement mechanism, and the pin 118 on the anchor extends upwardly into the slot. A spring 114 tends to hold the carrying plate 111 in the position of rest shown in Fig. 3, in which the pin 118 on the anchor 88 is in the wide part of the slot 117 so that the anchor is not coupled to the pendulum, but is free to vibrate by itself without causing movement of the pendulum.

The free end of the carrying plate 111, beyond the pendulum pivot 112, has a bent-up ear 119 arranged to cooperate with an edge 120 on the master ring 37. When the master ring is set for pre-timing, the edge 120 engages the ear 119 and moves the carrying plate 111 in a counterclockwise direction around its pivot 110 from the position shown in Fig. 3 to the position shown in Figs. 4 and 11. This moves the pivot 112 of the pendulum 113 so as to bring the pin 118 on the anchor 88 into the narrow part of the slot 117 on the pendulum. This couples the pendulum to the anchor so that the anchor can not vibrate without causing a corresponding vibration of the pendulum.

When the master member is released, the edge 120 maintains the end 119 of the carrier plate 111 in this position until the ear 65 slips out of the notch 66, at which time the pre-timing is completed. Hence, during the pre-timing operation, the anchor 88 of the escapement mechanism must vibrate the pendulum 113 which, because of its masses 115 and 116, materially slows down the vibrations of the anchor and thus slows the retarding mechanism to the extent necessary during the pre-timing operation. As the ear 65 slips out of the notch 66 at the end of the pre-timing operation, the end 119 of the carrying plate 111 also slips off of the edge 120 of the master member, so that the spring 114 restores the carrying plate 111 to its position of rest shown in Fig. 3, in which the pendulum 113 is uncoupled from the anchor 88 and the anchor is free to vibrate by itself without being impeded by the pendulum. When the pendulum is in this position of rest, its end 116 is forced into a V-shaped corner of a recess 121 in the base plate 19, thus holding the pendulum against movement and insuring the placing of the slot 117 in such position that it will not interfere with the pin 118 on the anchor 88.

Means is preferably provided for moving the anchor 88 out of cooperative engagement with the escapement wheel 87 to assist in the rapid positioning of the retarding mechanism when the master member 37 is being set, particularly when the pre-timing feature is to be used, since the setting and pre-timing involves a substantial rotation of the gears of the retarding mechanism from the position shown in Fig. 3 to that illustrated in Fig. 4, as previously explained. This moving of the anchor 88 at the proper time is accomplished by mechanism best shown in Figs. 3, 9, and 10. The anchor 88 is pivoted at 125 to the plate 126 which is arranged to turn on a stationary pivot 127 and which is constantly urged in a clockwise direction by the spring 128. A bent-up ear or lug 129 on the plate 126 cooperates with the edge 130 of the master member 37, which edge has a step or ledge 131 at its left end and a projection 132 at an intermediate point, as best shown in Fig. 3. Both the ledge 131 and the projection 132 are of sufficient height so that when they contact with the lug 129 on the plate 126, the plate is turned in a counterclockwise direction to move the pivot 125 of the anchor 88 so that the anchor is out of engagement with the escapement wheel 87. The other portions of the edge 130, however, are sufficiently low so that they do not hold the anchor in this disengaged position.

An arm 133 on the plate 126 cooperates with a pawl 134 pivoted at 135 and influenced by a spring 136 which tends to move the pawl beneath the arm 133, to hold the plate 126 in such position that the anchor is disengaged. The pawl 135 has an arm 137 at approximately right angles to the pawl, which has an upstanding lug 138 in position to be moved by the projection 139 and the ledge 140 on the master member 37. When the lug 138 is shifted by either projection 139 or ledge 140, it is moved inwardly towards the center of the shutter and this moves the pawl 134 in a clockwise direction, releasing the arm 133 of the plate 126. Between the portions 139 and 140, the edge of the master member is cut away so that it does not release the pawl.

In the position of rest illustrated in Fig. 3, the lug 129 is pressed outwardly by the ledge 131 and the pawl 134 engages the arm 133 to hold the anchor disengaged. When the master member 37 is moved to set the shutter, the ledge 131 slides out from under the lug 129 but the pawl 134 nevertheless continues to hold the anchor in its disengaged position. Toward the end of the normal setting movement (that is, when pre-timing is not used) the projection 139 acts upon the lug 138 to displace the pawl 134, which allows the spring 128 to move the anchor 88 into engagement with the escapement wheel 87, but this engagement is only momentary because at the same instant that the projection 139 rides out from under the lug 138, the projection 132 engages the lug 129 and once more moves the anchor to its disengaged position, allowing the pawl 134 once more to engage the arm 133 to hold the anchor disengaged. Just after this takes place, the normal setting movement of the master member 37 is completed. Then when the master member is released to make an exposure, it moves in the opposite direction and practically at the beginning of this movement the projection 132 engages the lug 129 and is immediately followed by the engagement of the projection 139 with the lug 138, thus releasing the pawl 134 and allowing the spring 128 to engage the anchor 88 with the escapement wheel 87. All of this takes place during the initial part of the movement of the master member, which is effective to open the shutter blades, so that the anchor is properly engaged and the retarding mechanism is effective by the time the shutter blades are fully open.

When the master member is to be set for a pre-timed exposure, the above described setting movements take place, and in addition, the master member is moved still further to a point where the ledge 140 moves the lug 138 inwardly to release the pawl 134 and thus to re-engage the anchor 88. This re-engagement of the anchor does not take place, however, until practically the end of the additional setting movement of the master member, so that the anchor is still disengaged and the retarding mechanism gears are free to rotate easily at the time when the ear 65 swings the plate 67 to move the plate 91 and the retarding mechanism.

Then, upon releasing the master member from its pre-timing set position, the master member commences to move in a counterclockwise direction, but this movement is impeded and greatly slowed down by the retarding mechanism which is coupled to the master member at this time through the plate 67, the retarding mechanism itself being greatly slowed down by being coupled to the auxiliary retarding pendulum 113. After the pre-timing retardation is finished and the normal exposure movement is about to begin, the projection 132 strikes the lug 129 and momentarily disengages the anchor, but this is immaterial because the retarding mechanism is not functioning at this instant and the anchor is quickly re-engaged by the projection 139 displacing the pawl 134, after which the rest of the exposure movement is the same as previously described.

As shown in Fig. 10, the plate 126 on which the anchor 88 is pivoted, is provided with a slot near one edge forming a finger 141 which engages against the stop pin 142 to limit the clockwise movement of the plate 126 and thus to limit the depth of engagement of the anchor 88 with the escapement wheel 87. This construction permits fine adjustment of the parts, since the finger 141 can be bent in one direction or the other to determine the position of the plate 126 with great accuracy, and thus to obtain exactly the right depth of engagement of the anchor.

It is desirable also to hold the anchor out of engagement with the escapement wheel when the shutter is set for "bulb" and "time" exposures, since the retarding mechanism is not needed for such exposures. It is also desirable to disengage the anchor when the shutter is set for its highest speed, such as one eight hundredth of a second, for example, because when set for this high speed, the master member moves with great rapidity and the striking of the projection 132 against the lug 129 at high speed might damage the parts. In order to hold the anchor disengaged at these times, the lug 129 is made sufficiently long so that it projects above the master member and cooperates with a cam surface 145 formed on the under side of the adjusting disk 62. Throughout its intermediate portion, the cam surface 145 is so formed that it does not interfere with movement of the lug 129 to a position in which the anchor is engaged. When the adjusting disk 62 is turned to set the shutter for "bulb" or "time" exposure, however, a higher portion or ledge 146 at one end of the cam surface 145 rides under the lug 129 and pushes it outwardly to disengage the anchor. Similarly, when the adjusting disk is moved in the opposite direction to set the shutter for an exposure of one eight hundredth of a second, a ledge or elevated portion 147 likewise moves the lug 129 outwardly to disengage the anchor and to hold it far enough out so that it will not be hit by the projection 132 on the master member.

After the master member has been set, either to its ordinary set position or to the pre-timing set position, it may be disengaged by any suitable known mechanism which need not be described here in great detail. As one possible form of such disengaging mechanism, there may be provided, as shown in Figs. 3, 13 and 14, a plate 150 pivoted at 151 and connected to the parts 152 and 153 so that it may be swung in a clockwise direction either by hand or by a cable release against the action of the spring 154. A pin 155 on the plate 150, during such clockwise swinging of the plate, engages a pawl 156 which is pressed in a clockwise direction by the spring 157 and moves this pawl out of either of the notches 158 and 159 in which it may have been seated. When the master member is set for ordinary exposure, the pawl seats in the notch 158, but when the master member is given an additional increment of motion to provide a pre-timed exposure, then the pawl 156 seats in the notch 159.

In order to prevent the pawl 156 from accidentally engaging the notch 158 after it has been released from the notch 159, the pawl is provided with a projection 160 which engages the pin 155 when the release mechanism is actuated, to lock the pawl 156 and lever 150 to each other and to prevent either of them from returning to their initial position. This interlocking relationship is illustrated in Fig. 14. During the movement of the master member following its release, an inclined edge 161 thereon engages the pawl 156 after the notch 158 has safely passed, and turns the pawl slightly in a counterclockwise direction, which unlocks the pin 155 from the projection 160 on the pawl, and allows the lever 150 to return to its normal position of rest.

For effecting "bulb" and "time" exposures, various actuating and control levers may be secured to the lever 150 in the manner well known in the art.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention and the scope of the appended claims.

We claim:

1. A photographic shutter comprising a master member for operating shutter blades, retarding mechanism for retarding movement of the master member, and means for operating the retarding mechanism from the master member with a plurality of different transmission ratios at different times during a single operating movement of the master member, each of said ratios being substantially constant for an appreciable part of said single operating movement.

2. A photographic shutter comprising a master member for operating shutter blades, retarding mechanism for retarding movement of the master member, and means for operating the retarding mechanism from the master member with a lower transmission ratio substantially constant during an early part of a single operating movement of the master member and a higher transmission ratio substantially constant during a later part of such movement.

3. A photographic shutter comprising a master member for operating shutter blades, retarding mechanism for retarding movement of the master member, a mechanical system operative to connect the master member to the retarding mechanism at one ratio during a part of a movement of the master member, and a second mechanical system differing from the first system at least in part for connecting the master member to the retarding mechanism at a different ratio during another part of said movement of the master member.

4. A photographic shutter comprising a master member for operating shutter blades, retarding mechanism including a gear train for retarding movement of the master member, means for connecting the master member to the gear train at one ratio for timing relatively short exposures, and means for connecting the master member to the gear train at a higher ratio to increase the resistance of the gear train for timing longer exposures.

5. A photographic shutter comprising a master member for operating shutter blades, escapement means for retarding movement of the master member, mechanism including two members pivoted to each other for operatively connecting said master member to said escapement means, and setting means for varying the relative positions of said two pivoted members to each other to vary the effect of said escapement means on said master member.

6. A photographic shutter comprising a master member for operating shutter blades, escapement means for retarding movement of the master member, mechanism including two members pivoted to each other for operatively connecting said master member to said escapement means, setting means for varying the relative positions of said two pivoted members to each other to vary the effect of said escapement means on said master member, and other escapement means driven by one of said two pivoted members.

7. A photographic shutter comprising a master member for operating shutter blades, escapement means for retarding movement of the master member, mechanism including two levers pivoted to each other for operatively connecting said master member to said escapement means, control means for varying the relative positions of said levers to each other to vary the effect of said escapement means on said master member, other escapement means driven by one of said levers, and separate control means for adjusting said one of said levers.

8. A photographic shutter comprising a master member mounted for oscillation, retarding mechanism for retarding movement of said master member, and means for operatively connecting said master member to said retarding mechanism, said means including a member contacting with a part of said master member and moved thereby in a generally tangential direction with respect to the oscillation of said master member.

9. A photographic shutter comprising a master member for operating shutter blades, retarding mechanism for retarding movement of the master member, means for operatively connecting the master member to the retarding mechanism during an initial movement of the master member before the shutter blades are opened, and other means for operatively connecting the master member to the retarding mechanism during a subsequent movement of the master member after the shutter blades have been opened.

10. A photographic shutter comprising a master member for operating shutter blades, gear means for retarding movement of said master member, transmission means for operatively connecting said master member to said gear means during an ordinary exposure, and other transmission means automatically rendered operative to connect said master member to said gear means upon setting said shutter for a delayed exposure.

11. A photographic shutter comprising a master member for operating shutter blades, gear means for retarding movement of said master member, and means operatively connecting the master member to the gear means to move the gear means in one direction during a part of the operation of the master member and in an opposite direction during another part of the operation of the master member.

12. A photographic shutter comprising a master member for operating shutter blades, gear means for retarding movement of said master member, and means operatively connecting the master member to the gear means to move the gear means in one direction during a movement of the master member before the shutter blades are opened and to move the gear means in an opposite direction during continued movement of the master member in the same direction after the shutter blades are opened.

13. A photographic shutter comprising a master member for operating shutter blades, mechanism including a vibrating escapement anchor for retarding movement of said master member, both before and after the master member opens the shutter blades and means for operatively connecting an additional mass to said anchor to decrease the rate of vibration thereof before the shutter blades are opened.

14. A photographic shutter comprising a master member for operating shutter blades, mechanism including a vibrating escapement anchor for retarding movement of said master member both before and after the master member opens the shutter blades, an additional mass operatively connected to said anchor to decrease the rate of vibration of the anchor during movement of said master member before said shutter blades are opened, and means operated by movement of said master member for shifting said additional mass to disconnect it from said anchor to increase the rate of vibration of the anchor.

15. A photographic shutter comprising a master member for operating shutter blades, mechanism including a vibrating escapement anchor for retarding movement of said master member, and means for rendering said anchor ineffective throughout substantially the entire extent of a setting movement of the master member.

16. A photographic shutter comprising a master member for operating shutter blades, mechanism including a vibrating escapement anchor for retarding movement of said master member, a control member settable to different positions for determining different exposures, and means for rendering said anchor ineffective upon moving said control member to a predetermined position.

17. A photographic shutter comprising a control member settable to different positions to determine different kinds of exposures, means settable to one position to effect an ordinary exposure and settable to a different position to effect a delayed exposure, and interlocking means preventing said settable means from being set in said different position whenever said control member is in a predetermined position.

18. A photographic shutter comprising a control member settable to different positions to determine different kinds of exposures including "bulb" and "time" and "instantaneous" exposures, means settable to one position to effect an ordinary exposure and settable to a different position to effect a delayed exposure, and stop means controlled by said control member for preventing setting of said settable means in said different position whenever said control member is set for "bulb" or "time" exposures.

19. A photographic shutter comprising a master member for operating shutter blades, retarding mechanism, transmission mechanism operated by the master member to move the retarding mechanism in one direction during part of a movement of the master member, other transmission mechanism operated by the master member to move the retarding mechanism in an opposite direction during another part of said movement of the master member, and means for insuring the positioning of said retarding mechanism in a definite predetermined position at the end of its movement in the first direction and before the beginning of its movement in the opposite direction.

20. A photographic shutter capable of making selectively either a normal exposure or a delayed exposure, comprising a master member for operating shutter blades, a gear train for retarding movement of said master member both during a normal exposure and during a delayed exposure, means operatively connecting said master member to said gear train during a normal exposure, and a transmission member ineffective during a normal exposure but effective during a delayed exposure to connect said master member to said gear train.

21. A photographic shutter comprising a master member for operating shutter blades, mechanism including a vibrating escapement anchor for retarding movement of said master member, transmission means for operatively connecting said master member to said retarding mechanism during an ordinary exposure, other transmission means automatically rendered operative to connect said master member to said retarding mechanism upon setting said shutter for a delayed exposure, and an additional mass automatically connected to said escapement anchor upon setting said shutter for a delayed exposure, for decreasing the rate of vibration of said anchor.

22. A photographic shutter comprising a master member for operating shutter blades, mechanism including a vibrating escapement anchor for retarding movement of said master member, means operatively connecting said master member to said retarding mechanism after said master member has opened the shutter blades, means effective when a delayed exposure is desired for operatively connecting said master member to said retarding mechanism also before said master member has opened the shutter blades, and an additional mass automatically connected to said escapement anchor by the setting of the shutter for a delayed exposure, for decreasing the rate of vibration of said anchor.

23. A photographic shutter comprising means for operating shutter blades, retarding mechanism for said operating means, said retarding mechanism including a vibrating escapement anchor member, an additional mass member capable of being operatively connected to said anchor member and of being disconnected therefrom, and means effective when said additional mass member is disconnected from said anchor member to hold said additional mass member in a predetermined position in which it will not interfere with movement of said anchor member.

24. A photographic shutter comprising means for operating shutter blades, retarding mechanism for said operating means, said retarding mechanism including a vibrating escapement anchor member, an oscillatable mass member, means including a pin on one of said members and a slot in the other of said members for operatively connecting them to and disconnecting them from each other, said slot including a narrow part for embracing said pin relatively closely to connect said mass member to said anchor member to vibrate therewith and also including a wider part for receiving said pin when said members are to be disconnected, and means for holding said mass member, when disconnected from said anchor member, in a predetermined position with respect to its range of oscillation so that said mass member will not interfere with free vibration of said anchor member.

H. DECKEL.
MICHAEL BURGER.